(12) United States Patent
Vaccari

(10) Patent No.: US 9,162,825 B2
(45) Date of Patent: Oct. 20, 2015

(54) MACHINE FOR PACKAGING PRODUCTS IN RIGID OR SEMIRIGID TRAYS SEALED ACROSS THE TOP BY A THERMOPLASTIC FILM, PARTICULARLY FOR PRODUCING PACKS IN A MODIFIED ATMOSPHERE

(75) Inventor: Massimiliano Vaccari, Reggio Emilia (IT)

(73) Assignee: GRUPPO FABBRI VIGNOLA S.p.A., Vignola (IT)

( * ) Notice: Subject to any disclaimer, the term of this patent is extended or adjusted under 35 U.S.C. 154(b) by 800 days.

(21) Appl. No.: 13/388,731

(22) PCT Filed: Aug. 3, 2010

(86) PCT No.: PCT/EP2010/061263
§ 371 (c)(1),
(2), (4) Date: Feb. 24, 2012

(87) PCT Pub. No.: WO2011/018391
PCT Pub. Date: Feb. 17, 2011

(65) Prior Publication Data
US 2012/0144785 A1 Jun. 14, 2012

(30) Foreign Application Priority Data
Aug. 10, 2009 (IT) .............................. BO2009A0541

(51) Int. Cl.
*B65B 31/02* (2006.01)
*B65G 25/02* (2006.01)

(52) U.S. Cl.
CPC .............. *B65G 25/02* (2013.01); *B65B 31/028* (2013.01)

(58) Field of Classification Search
CPC ...... B21D 43/055; B65B 35/20; B65B 43/48; B65B 31/028; B65B 31/04; B65B 7/164; B65B 7/2878; B65G 25/02; B65G 25/00; B65G 25/08; B65G 47/082; B65G 47/82; B65G 47/8823
USPC ............. 53/511, 249, 250, 329.2, 329.3, 509, 53/122, 531, 534, 543, 510
See application file for complete search history.

(56) References Cited

U.S. PATENT DOCUMENTS

| 3,874,145 | A | | 4/1975 | Schmidt |
| 4,624,099 | A | | 11/1986 | Harder |
| 4,685,274 | A | | 8/1987 | Garwood |
| 4,974,392 | A | * | 12/1990 | Mondini ......................... 53/287 |
| 5,065,563 | A | | 11/1991 | Robache |

(Continued)

OTHER PUBLICATIONS

International Search Report for PCT/EP2010/061263.
(Continued)

*Primary Examiner* — Andrew M Tecco
*Assistant Examiner* — Chelsea Stinson
(74) *Attorney, Agent, or Firm* — Marvin Petry; Stites & Harbison PLLC

(57) ABSTRACT

A machine with a series of three operating stations, of which the first station arranges the full trays in a predetermined pattern while the second station closes the full trays with a film and in which the third station discharges the full trays. The stations are equidistant from each other. A transfer structure has combs that have a length such as to occupy simultaneously two consecutive such stations and that are provided with the teeth that can grasp the trays, lift the groups of trays and then move longitudinally to transfer the groups of trays from one station to the next, then lower the tray to deposit the groups of trays in the new stations.

7 Claims, 4 Drawing Sheets

(56) References Cited

U.S. PATENT DOCUMENTS

| | | | |
|---|---|---|---|
| 5,271,207 | A | 12/1993 | Epstein et al. |
| 5,475,965 | A | 12/1995 | Mondini |
| 6,912,828 | B1 | 7/2005 | Yamay |
| 7,290,380 | B2 * | 11/2007 | Natterer .................. 53/309 |
| 2001/0017021 | A1 | 8/2001 | Sanfilippo |
| 2009/0101758 | A1 | 4/2009 | Leyre |

OTHER PUBLICATIONS

Written Opinion of the International Searching Authority for PCT/EP2010/061263.

* cited by examiner

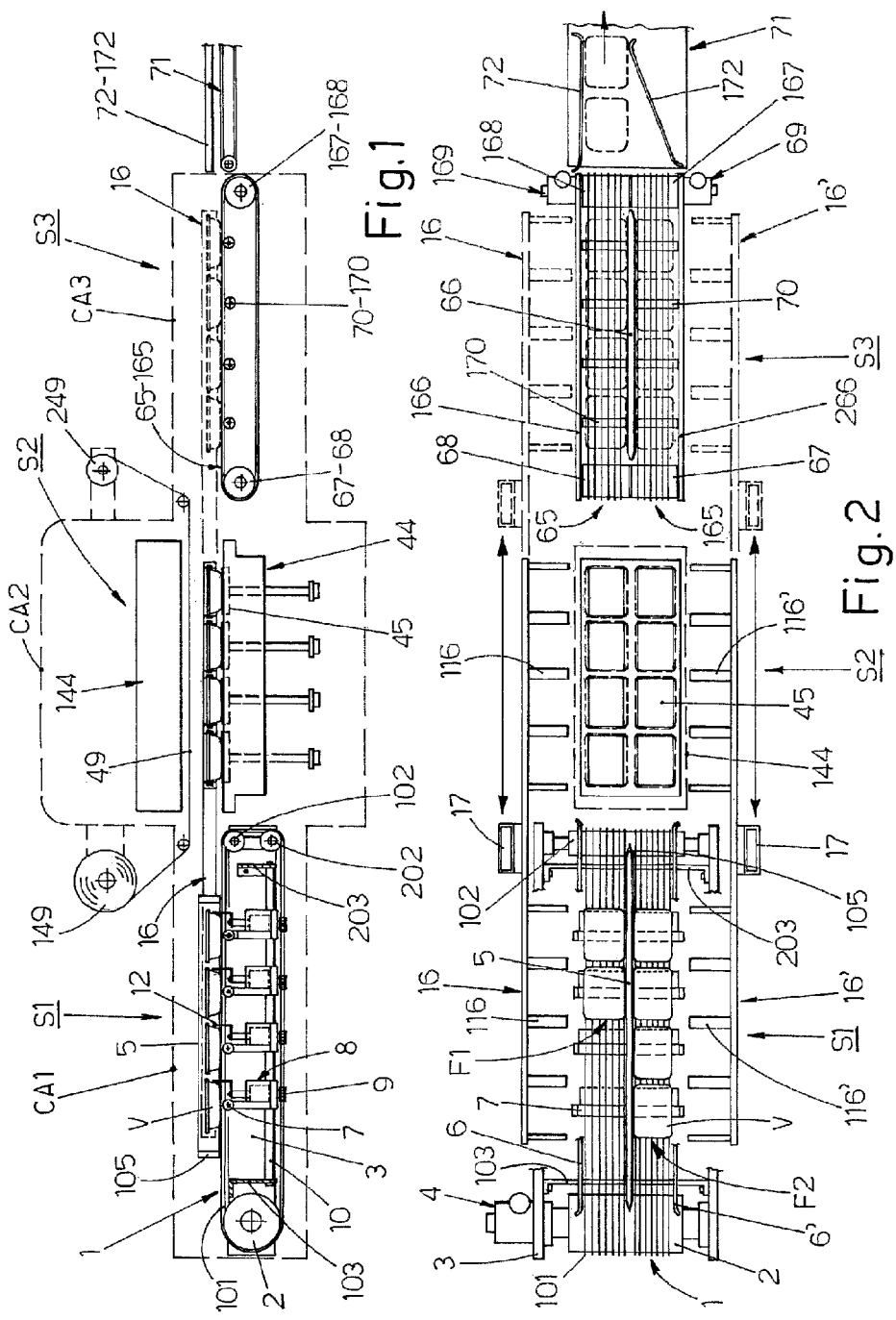

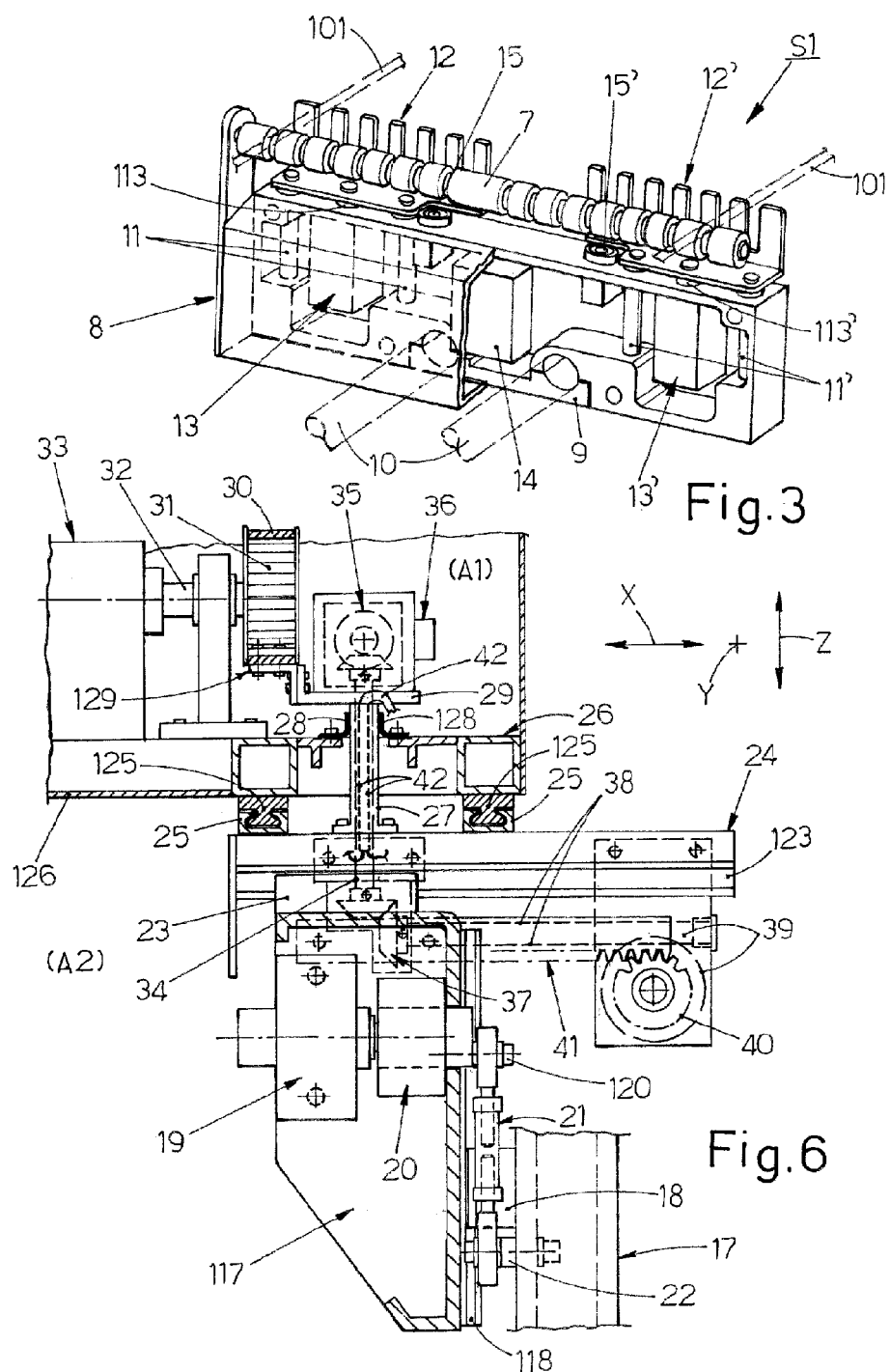

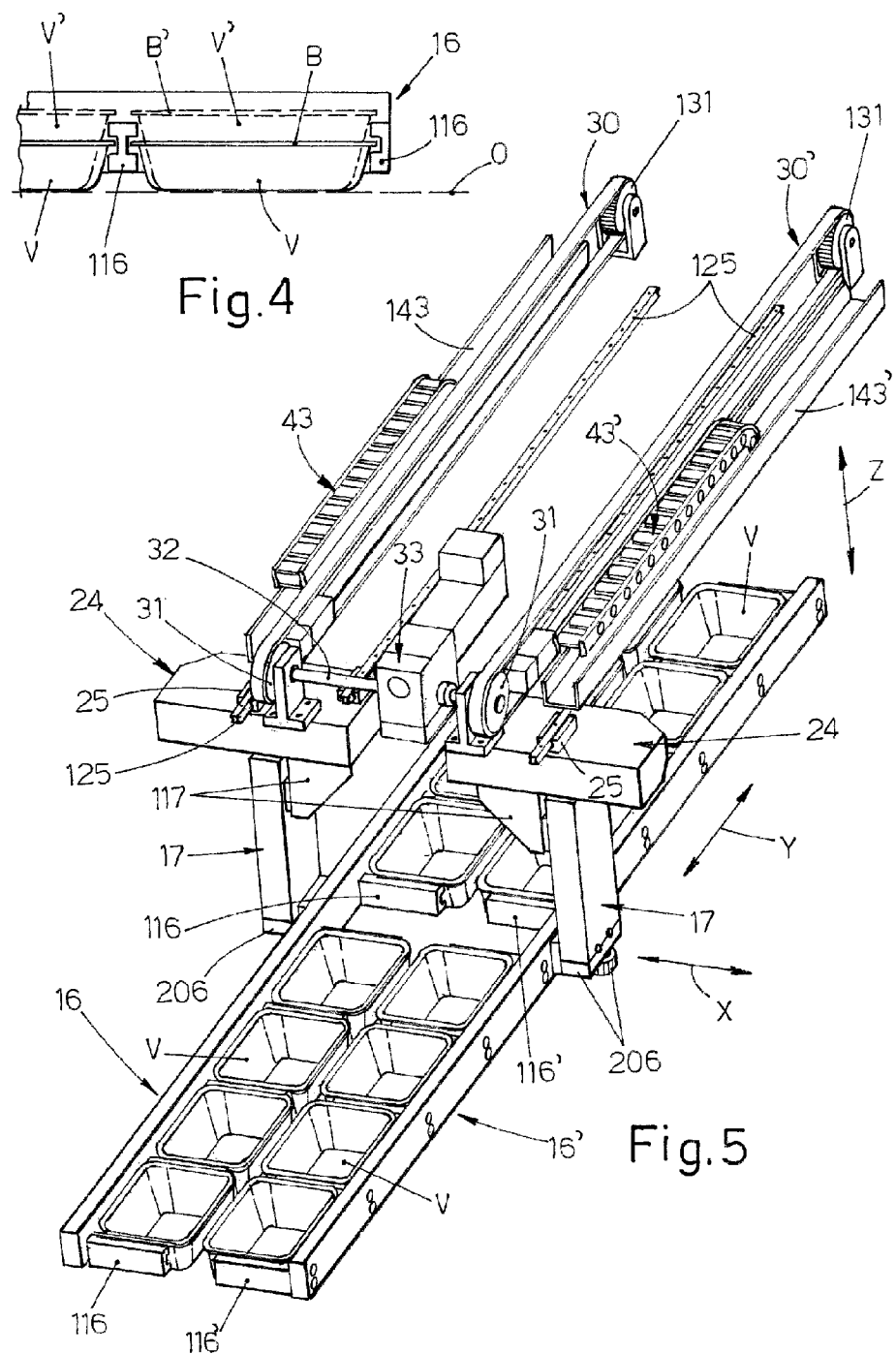

MACHINE FOR PACKAGING PRODUCTS IN RIGID OR SEMIRIGID TRAYS SEALED ACROSS THE TOP BY A THERMOPLASTIC FILM, PARTICULARLY FOR PRODUCING PACKS IN A MODIFIED ATMOSPHERE

The invention relates to an automatic machine for packaging products in general, especially food products in rigid or semirigid trays, made usually of any material impermeable to gases or to certain gases and of a height correlated to the amount of product to be packed and such that they can be closed by sealing to their top edge a usually transparent sheet of thermoplastic gas-barrier material, particularly for producing packs in a modified atmosphere beneficial to the preservation of the packed products. The machine in question, which has intermittent operation, comprises: a first station for preparing groups of trays with the product arranged with the correct mutual spacing in one or two parallel rows; an intermediate station for closing and heat-sealing a cover onto the top edge of said groups of trays, after optionally removing the air from said trays and/or replacing said air with a modified atmosphere useful for the preservation of the packaged products and with a subsequent cutting operation to separate the closed trays from the continuous web from which said closing cover is taken; a final discharging station; and means for cyclically transferring the groups of trays from said first station to said second station and from this second station to said third and final or discharging station. As compared with the prior art consisting of U.S. Pat. Nos. 3,874,145, 4,624,099, 4,685,274, 5,065,563, 5,271,207, 6,912,828 and US 2001/0017021A1, the invention provides a packaging machine as indicated above, with limited costs, easily adaptable to the varying requirements of medium and small end production, that has high technological reliability and high hourly throughput, and that can handle the trays with the product with extreme delicacy and without dragging them along fixed slider guides, avoiding damage or unsightly scratching of the trays and the formation of dust contaminants in the intermediate packing station of the machine. These objects are achieved by constructing the three stations of the machine in the form essential for the task they are to accomplish, eliminating the conventional interconnecting conveyor between these stations and using moving and lifting combs to transfer together, from one station to the next, pre-arranged groups of trays placed on one or two rows with more than one tray in each row. A further object of the invention is to provide a packaging machine having the aforesaid features that can be washed easily and completely without damage to the electric motors and drive mechanisms of said moving and lifting combs which carry out the cyclical advancing of the groups of trays, in that these means are confined within a sealed upper chamber of the machine. These and other features of the packaging machine are summarized in the appended claim 1) and will be made clearer by the following description of a preferred embodiment of these, illustrated purely by way of non-restrictive example in the figures of the four attached sheets of drawings, in which:

FIGS. 1 and 2 are a schematic side view and a schematic top plan view, respectively, of the machine;

FIG. 3 shows one of the adjustable-positioning modules that stop the trays in accordance with a predefined plan in the first station of the machine;

FIG. 4 is an enlarged side view of two of the variously shaped fingers of the moving and lifting combs for the cyclical transfer of the groups of trays between the three operating stations of the machine;

FIG. 5 is a top perspective view of the means for moving the transfer combs;

FIG. 6 is an end view with parts in section showing one of the carriages that actuate said moving and lifting combs with movements on three orthogonal axes;

Figure 7:
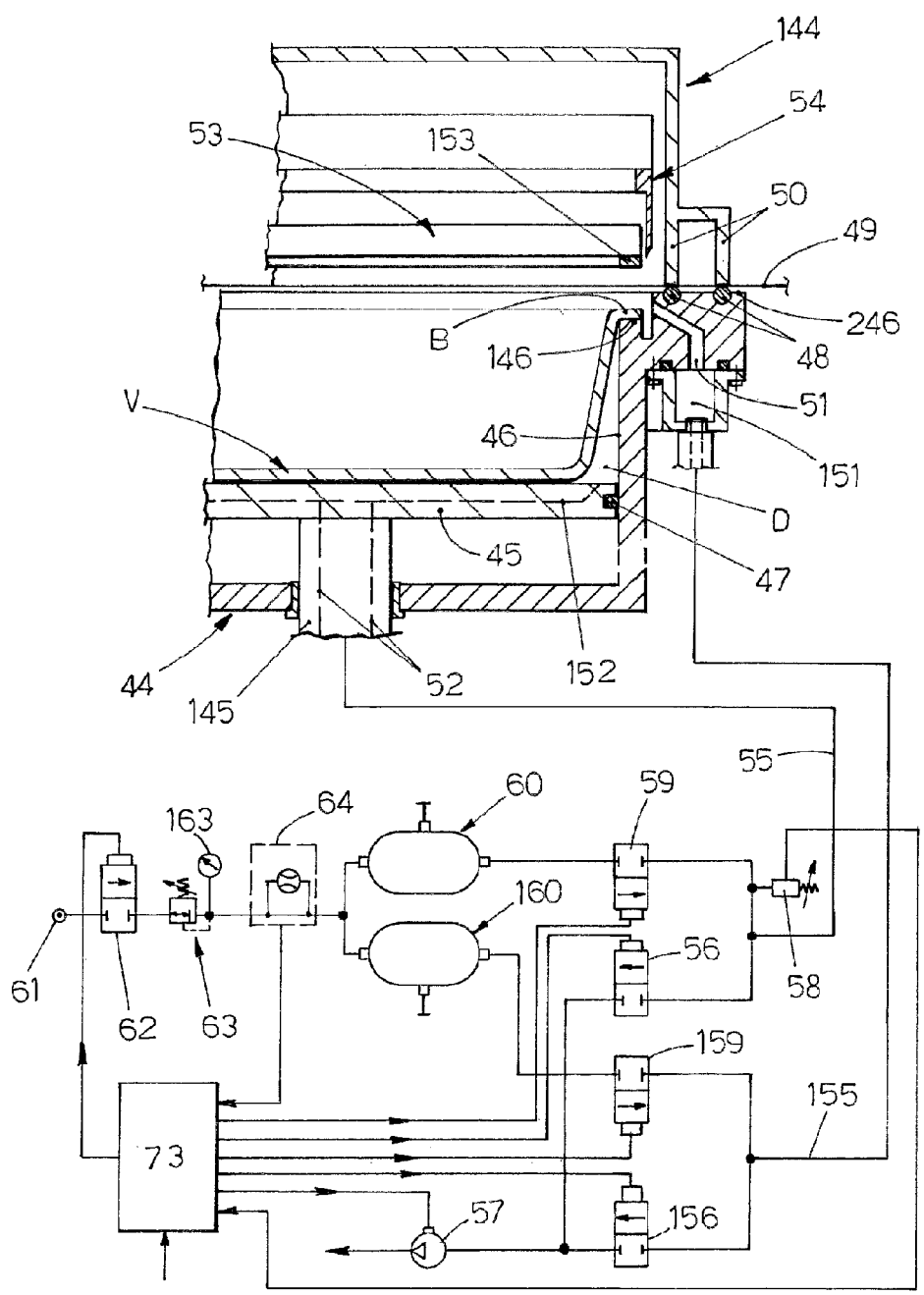
FIG. 7 is a partial view, with parts in section and with a circuit diagram, showing the central workstation of the machine, which handles the steps of atmosphere modification inside the pack, sealing and cutting to separate the packs from the continuous sheet of material used for the top closure of said packs.

As can be seen in FIGS. 1 and 2, the machine comprises a first station S1 suitable for arranging the trays V with the product in one or two parallel rows F1, F2, by way of example four trays per row, comprises an intermediate station S2 to which the groups of trays arranged in station S1 are transferred in order to be closed at the top by a sheet of thermoplastic material after a modified atmosphere has been established in these trays, where the closure sheet is taken from a continuous web from which the formed packs are separated by a cutting operation performed at the end of the cycle in station S2, and lastly comprises a final discharging station S3 to which the trays formed in station S2 are transferred. According to the invention, said workstations S1, S2, S3 are equidistant from each other in the horizontal direction, and alongside these stations are moving and lifting combs 16, 16" whose length is such that they can intervene simultaneously on two consecutive stations and such that on command they can simultaneously transfer the groups of trays from station S1 to station S2 and from station S2 to station S3. Station S1 comprises a horizontal conveyor 1 formed by a plurality of belts 101 for the material suitable for sliding contact with the trays V, preferably round-sectioned, with the type having internal reinforcing cores arranged parallel with each other a short distance apart and running at the correct tension in the annular grooves of parallel rollers 2, 102, 202 supported by a base frame 3, of which the roller 2 of greatest diameter is driven by a motion unit 4 in such a way that the trays V resting on the upper run of the conveyor 1 are directed towards the station S2. The upper run of the conveyor 1 is divided into two lanes, whose width is correlated to that of the trays V of the rows F1, F2, by means of a longitudinal central guide 5, which is connected to lower parts of the frame 3 and has divider ends 105, and by means of lateral guides 6, 6'. The latter guides project a short distance from the upper run of the conveyor 1 and are connected to the frame 3 adjustably to allow for variations in the dimensions of the trays V. Whereas the guide 5 acts on the top edge of the trays, the lateral guides 6, 6' act on the bottom part of the body of these trays, which for this purpose have outer edges free of obstacles up to a short distance from the conveyor 1. To ensure that the trays placed on the conveyor 1 are as nearly as possible coplanar and horizontal, the upper run of the belt 101 runs on small grooved idle rollers 7 supported rotatably at the ends by brackets mounted on boxes 8 as detailed in FIG. 3. The bottoms of the boxes 8 have clamps 9 for the adjustable and removable fixing of two rods 10 set longitudinally in the centre of the base frame 3. These rods are fixed to the latter at their ends by crosspieces 103, 203. Pairs of vertical rods 11, 11' project through the top wall of each box 8 to support the bases of angle bars 12, 12' whose vertical arms are grille-like with round-pointed upward teeth which in the rest position are located beneath the upper run of the conveyor 1 so as not to interfere with the passing trays and which on command can be raised so that their teeth pass between and above the belts 101 to act as perpendicular barriers between the guides 5, 6, 6', which stop the trays on the upper run of the conveyor 1 in accordance with a predetermined order and plan. Each grille 12, 12' is connected to the rod 113, 113' of a corresponding linear actuator 13, 13' (e.g. a double-acting fluid pressure activator) whose body is mounted inside the box 8 together with the unit 14 of their electric actuating valve. On the top wall of each box 8, in recesses in the bases of the grilles, 12, 12', there are also sensors 15, 15' which face upwards to explore the free space between two adjacent belts 101 and detect the presence or absence of a tray upstream of said grilles. At the start of each operating cycle, all the grilles 12, 12' are down with the exception of the end pair of grilles nearest the intermediate station S2, which is up. The trays carrying the product are advanced along the two rows F1 and F2 of the conveyor 1 with adequate spacing between each other. When trays reach the raised end grilles, the trays are stopped by the grilles and their presence is detected by the sensors underneath them which order the grilles immediately behind them to be raised and thereby stop the next pair of trays, and the cycle is repeated until all the grilles 12, 12' are raised and until four trays per row have been stopped on each row F1, F2 of the conveyor 1. With the arrival of the last trays, the conveyor 1 is automatically stopped. The grilles also operate by contact on part of the body of the trays. It will be obvious that, because of the distributed contact of the transverse grilles 12, 12' and longitudinal guides 5, 6, 6' on the trays, these trays V carrying the product will stop in an orderly manner, in perfect alignment both longitudinally and transversely, even if the trays themselves are not perfectly rigid and even if the weight of product contained in them is off-centre and asymmetrical. Once the trays are arranged in an orderly manner in S1 and the conveyor 1 has been stopped, the grilles 12, 12' are lowered to allow the insertion, into the space between the front portion and rear portion of the bodies of the trays in the two rows F1, F2, without interference with the trays, and by a horizontal movement along an X axis, of the teeth 116, 116' of a pair of moving and lifting combs 16, 16' (FIGS. 2 and 5) located at the sides of the stations S1, S2. These combs are parallel to the longitudinal axis of the machine and are connected to means described below which, after said insertion stroke, move these combs with the trays through a short vertical upward stroke along a Z axis, as a result of which the trays are suspended between the teeth 116, 116', followed by a horizontal stroke along a Y axis, for the purpose of transferring the groups of trays from station S1 to station S2 and simultaneously transferring the trays which were in station S2 (see later) to the final station S3. After said movement along the Y axis, the combs 16, 16' are lowered in order to carefully deposit the trays in stations S2 and S3 and no longer interfere with these trays. They are then caused to make a horizontal stroke along the X axis to withdraw their teeth 116, 116' from the groups of trays, and finally are returned to the start-of-cycle position by a horizontal movement along the Y axis, the reverse of the previous such movement. As can be seen in FIG. 4, the teeth 116, 116' of the moving and lifting combs may have a simple profile or a channelled profile, such as a C or double T profile, in such a way as to be able to operate on trays V and V' of different depths and for this purpose their upper edges B, B' are at different distances from the theoretical bottom or contact surface which is labelled 0. As FIGS. 5 and 6 show, each comb 16, 16' is attached quickly and removably, by a central clamp 206, to the lower end of a vertical arm 17 which itself has precision slides 18 allowing it to run on complementary vertical guides 118 mounted on a forearm 117 which may for example be of box construction to house a sealed actuator 19, which operates a crank mechanism 20 whose crank button 120 projects from the forearm at right angles to said guides 118 and is connected to an adjustable-length link 21, the other end of which pivots on a pin 22 fixed to the arm 17, in such a way that the comb connected to the latter can receive from said link and crank assembly the necessary upward and downward movement along said axis Z, with the acceleration and deceleration phases necessary to ensure that the tray collecting and releasing movements of the teeth 116, 116' do not jerk the product packed in the trays, which may be liquid and therefore requires gentle handling. To make sure this happens, the actuator 19 may be driven intelligently and for this purpose may have electronic speed and phase control. The detail view, FIG. 6, also shows that horizontal precision slides 23 are mounted on top of the forearm 117 and travel in corresponding straight guides 123 oriented along the X axis and fixed to the underside of a carriage 24, mounted on top of which are precision slides 25 by means of which it travels on straight horizontal guides 125 oriented along the Y axis and connected to a base frame 26 which is in the upper part of the intermediate area of the machine (FIG. 1), which frame is closed on its underside by closing walls 126 that separate an upper chamber A1 in which the X- and Y-axis comb actuating means are confined, from the lower chamber A2 in which the products are packaged, to avoid contaminating this lower chamber and ensure that it can be washed cyclically without damage to the parts contained in the upper chamber A1. For this purpose, a plate 27 of rectangular plan shape is fixed to the upper part of the carriage 24 perpendicularly with its long dimension along the Y axis so that it runs in a sealed manner in a window in the frame 26, parallel to said Y axis. This is sealed by any suitable means capable of allowing said plate to move forwards and backwards. To give an example, the plate 27, whose ends are rounded like the bow of a ship and which will therefore be called hereinafter a shuttle, runs between two flexible parallel gaskets 28, 128 attached to the longitudinal sides of said window in the frame 26. The gaskets are bent upwards for example and seal against each other and against the sides of the shuttle 27. The upper part of the shuttle projects into the chamber A1 and is connected to a strip 29 attached by a clamp 129 to the lower run of an endless toothed belt 30 oriented along the Y axis with its ends travelling around pulleys 31, 131 supported rotatably by brackets mounted on the frame 26, one of which pulleys is keyed to the slow output shaft 32 of a speed reduction unit 33 driven by an electric motor with electronic speed and phase control, e.g. a brushless motor, with two directions of rotation and with a brake, said motor being fixed to the same frame 26. FIG. 5 shows that the shaft 32 is such as to drive both the belt 30 and the belt 30' which moves the combs 16, 16'.

In an intermediate part of the shuttle 27 is a vertical seat through which there passes, with a lateral seal but with the ability to rotate, a vertical shaft 34 (FIG. 6) whose upper end is connected to a bevel gear pair 35 driven by an electric motor 36 with a brake and of the type having electronic speed and phase control, all of this being fixed to the strip 29 which operates in the chamber A1. The lower end of the shaft 34, however, is connected to a drive composed of a bevel gear pair 37, a shaft 38 and a worm-and-helical-wheel gear 39 fixed to the carriage 24, which last component 39 carries, keyed to it, a pinion 40 with its axis in the Y direction, meshing with a rack 41 oriented along the X axis and attached at one end to the forearm 117, which can therefore be displaced to insert and withdraw the teeth of the comb 16 or 16' between and from the trays that are to be or have been transferred. The shuttle 27 also has a seat for the passage and support of a pipe 42 (FIG. 6) that carries all the electrical cables necessary for powering and controlling the X- and Z-axis motion means which operate in the chamber A2 and which (FIG. 5) are connected to flexible raceways 43, 43' moving in corresponding guides 143, 143' fixed longitudinally to the frame 26 of the chamber A1, for the connection of the various electrical cables to a fixed command and control panel (not shown). It will be understood that the scope of the invention also includes the variants in which said fixed seals 28, 128 can be replaced with movable feathered seals or the like in use in machine tools and also the variant in which the arm 17 and the forearm 117 with their straight movements along the orthogonal X and Z axes may be replaced with robotic arm manipulators suspended from the carriage 24 and articulated only on horizontal axes parallel to the Y direction, which make it possible to perform the desired movements on the X and Z axes using motors with electronic speed and phase control, all located in the upper chamber A1, as may be devised and readily constructed by those skilled in the art. If the trays to be packed are large, they can be arranged on a central row in station S1 which will not have the central guide 5, and the groups of trays can then be transferred by the combs 16, 16' between the successive workstations of the machine, by limited movements of the combs along the X axis. FIG. 1 shows that the intermediate station S2 is of the type that comprises a lower underbell 44 and an upper bell 144, between which are the groups of trays, which were arranged in order in station S1, to be hermetically sealed and have their internal atmosphere modified, these means being provided for this purpose with a relative vertical movement towards and away from each other. As the trays are being inserted into S2, the bell 144 is raised above the underbell 44, which in turn is positioned so that the trays can be rested on the tops of individual plates 45 which close seats 46 in said underbell and which by means of lower rods or bars 145 can be moved by known means (not shown) vertically by a fixed amount or at least such that the edges B of the trays can rest on the outer edges 146 of the seats 46, so as to be supported during the subsequent operating stages of the station S2. In the embodiment shown in FIG. 7, the plates 45 may be provided with individual gaskets 47 which provide a lateral seal with the seats 46, in such a way as to form, above said plates 45, variable-volume chambers D based on the height of the trays and isolated from the external environment, to limit the volume of gases moved during the steps of modifying the atmosphere inside the trays (see later). The same FIG. 7 shows that the underbell 44 is provided, all the way around the group of trays that are placed upon it and that come from either or both preparation rows F1, F2, with a flat edge 246 raised a suitable amount above the edge 146 of the chambers 46, and it is on this flat edge 246 that the sealing gaskets 48 are located. FIG. 1 shows that under the bell 144 the thermoplastic film 49 is unwound from a feed reel 149 and connected to a scrap collecting reel 249 driven by suitable motion means, so that when in the next step the bell 144 and the underbell 44 come together as in FIG. 7, a peripheral edge 50 of said bell presses the film 49 down and seals it against the lower gaskets 48, in such a way as to seal off from the exterior the chambers D containing the trays V to be closed. The film 49 is raised a suitable amount from the upper edges B of the trays so that channels 51 open to the inward side of the raised edge 246 of the underbell and connected to a manifold 151 are in communication with the upper part of the chamber D above the tray which is closed by the film and communicates with the internal volume of said tray. The part of the chamber D beneath the tray and defined by the plate 45 may be sealed off from the exterior or may be connected by a network of grooves 152 formed in the plate 45 and extending out beyond the tray, with a channel 52 formed axially in the rods or pipes 145 by which the plate is moved, so as to connect to the circuit which subsequently extracts the air from inside the trays and/or optionally replaces it with a modified atmosphere of gases useful for preserving the products placed in the tray, before the sealing unit 53 is lowered and its hot edge 153 presses the film 49 down onto the edge B of the tray V and seals it to the latter, after which the die 54 descends to interact with the outer flank of the edge 146 of the underbell in order to cut off the portion of film that has closed the trays, from the rest of the film which, following lifting of the sealing unit, die and bell 144, is collected by the reel 249 and replaced by a new intact piece of film coming from the reel 149 in FIG. 1. Purely as an example (FIG. 7), the means for conditioning the atmosphere in the trays before they are closed may comprise two lines 55, 155 connected for example to said parts 52, 151 and which by means of electrically-operated valves 56, 156 can be connected to at least one vacuum pump 57. The operation of the latter is controlled by a vacuum sensor 58 which makes it possible to derive the control of the starting and stopping of the pump 57; or they may be connected by electrically-operated valves 59, 159 to tanks or accumulators of suitable capacity 60, 160 containing compressed gas for forming the modified atmosphere in the trays, this gas being supplied from a source 61 through on/off means 62, through a pressure regulator 63 with a manometer 163 and through a flow rate sensor 64 from which the command can be derived for switching the electrically-operated valve 62. Acting via a control panel 73 and without modifying any of the hardware of the machine, the operator can select the technique of optional internal conditioning of the trays prior to their closure, which will then be carried out by evacuating the air from the trays, or by injecting gas(es) into the trays or by first evacuating and then injecting gas(es) or by evacuating and simultaneously injecting gas(es) from mutually remote areas of the trays. Whenever the combs 16, 16' transfer a group of full trays from S1 to S2, the same combs transfer the group of full, conditioned and closed trays from S2 to a station S3 consisting of a pair of horizontal adjacent conveyors 65, 165 similar to the feed conveyor 1, with longitudinal, external and adjustable guides 166, 266. These two conveyors are mounted on a common supporting frame and separated by a longitudinal central guide 66 which divides the two rows of trays and whose belts travel around end rollers 67, 167 and 68, 168 driven by respective geared motors 60, 169. Small idle rollers labelled 70, 170 give flatness to the upper run of the belts of the conveyors 65, 165. With the subsequent activation of the motion units 69, 169, the rows of trays transferred on the conveyors 65, 165 are evacuated one at a time and the outgoing trays are lined up in single file on a conveyor 71 by two converging guides 72, 172. As FIG. 1 shows, the machine includes protective casing CA1, CA2, CA3, made entirely or partly of transparent material, all or partly removable and/or openable, to conceal all the moving parts.

The invention claimed is:

1. A machine for packaging products in rigid or semirigid trays sealed across the top by a thermoplastic film, for producing packs with a modified or nonmodified atmosphere, having intermittent operation, comprising:
 a first station arranged to prepare groups of product-filled trays arranged with a predetermined mutual spacing in one or two parallel rows;
 a second station arranged to close and heat-seal a cover onto the top edge of said groups of trays, after removing the air from said trays and replacing said air with a modified atmosphere useful for the preservation of the packaged products and with a subsequent cutting mechanism to separate the closed trays from a length of film from which said closing cover is taken;

a third station arranged to discharge the groups of trays with the packed product;

a transfer structure which cyclically and simultaneously transfers the groups of trays with the product from said first station to said second station and from the said second station to said third station, said first and third stations being equidistant from the second station in the horizontal direction, said transfer structure comprising moving and lifting combs that operate alongside said stations, that have a length such as to occupy simultaneously two consecutive such stations and have teeth which can be inserted transversely into engagement with the front and rear of the groups of the row or rows of trays, and then be raised so as to lift said groups of trays and remove them from a surface on which they were resting, then move longitudinally to transfer the groups of trays from the first and second stations to the station immediately following, then be lowered to deposit the groups of trays in the new stations, then be withdrawn laterally from said groups of trays, and finally be returned, by a longitudinal movement, the reverse of the previous movement, to the starting condition in order to be able to repeat the operation of moving the trays for the first and second stations to the immediately following station, said moving and lifting combs being movable along three orthogonal axes, namely along an X axis for horizontal movements towards and away from the groups of trays, a Y axis for horizontal movements for the transfer of trays from one station to the next, and a vertical Z axis for lifting and lowering movements, the moving and lifting combs each being fixed to the lower end of a respective vertical arm which has slides allowing it to run on complementary vertical guides mounted on a forearm housing a sealed actuator, which actuator operates a crank mechanism having a crank button connected to an adjustable link, the other end of which link pivots on a pin fixed to said arm, in such a way that the comb connected to the fixed arm can receive from said link and crank assembly the necessary variation in upward and downward motion along said Z axis, the forearm being provided at its top with horizontal slides to travel on corresponding straight guides oriented along the X axis and fixed to the underside of a carriage, mounted on top of which are slides which travel on straight horizontal guides oriented along the Y axis and connected to a base frame which is in the upper part of the second station of the machine, which frame is closed on its underside by closing walls that separate an upper chamber in which the X- and Y-axis comb actuating structure is confined and separated from the lower chamber in which the products are packaged, to avoid contaminating the lower chamber and to ensure that the actuating structure can be washed without damage to the parts contained in the upper chamber.

2. A machine according to claim 1, in which the teeth of the moving and lifting combs have a channeled profile, which allows the combs to operate, on trays of different depths or heights.

3. A machine according to claim 1, in which a plate in the form of a shuttle is fixed perpendicularly to the upper part of said carriage and runs in a sealed manner in a window in said frame, parallel to the Y axis and is sealed to allow said shuttle to move forwards and backwards, the upper part of said shuttle, which projects into the chamber carrying a strip attached to the run of an endless positive-drive belt oriented along the Y axis with its ends travelling around pulleys supported rotatably by brackets mounted on said frame, one of which pulleys is keyed to the slow shaft of a speed reduction unit driven by an electric motor with electronic speed and phase control, with two directions of rotation and with a brake, said motor being fixed to the same frame, there being in an intermediate part of said shuttle, a vertical seat through which there passes a shaft whose upper end is connected to a bevel gear pair driven by an electric motor with a brake and of the type having electronic speed and phase control, all of this being fixed to said strip, while the lower end of said shaft is connected to a positive-drive composed of a bevel gear pair, a horizontal shaft and a worm-and-helical-wheel gear supported by the carriage, which last component carries, keyed to it, a pinion with its axis in the Y direction, meshing with a rack oriented along the X axis and attached at one end to the forearm, which can therefore be displaced to insert and withdraw the teeth of the comb between and from the trays that are to be or have been transferred, said shuttle also being constructed to support a vertical pipe that carries all the electrical cables necessary for powering and controlling from a fixed panel all the X- and Z-axis motions which occur in the lower chamber.

4. A machine according to claim 1, including a robotic arm hung from each said carriage and connected to an upper plate for horizontal movement of the combs along the horizontal Y axis, the robotic arm having a forearm, an arm and a wrist which carries a corresponding comb, and wherein the rotations are all connected to the upper axis of the connection to said carriage, such that respective positive motion passes through said shuttle to operate each robotic arm by motion units which are located in the upper chamber of the machine, to impart to the combs said movements along the X and Z axes.

5. A machine according to claim 1, in which the second station comprises a lower housing with a chamber whose volume is variable in relation to the height of the trays to be closed and with a sealing structure which seals them off from the exterior, so that the amount of gas required for the internal conditioning of the trays is related in each case to the actual dimensions of said trays.

6. A machine according to claim 1, including a control panel with software which can be used, without in any way modifying the hardware of the machine itself, to select the method of optional internal conditioning of the trays before their closure, which may be done by evacuating the air from the trays, by injecting gas into said trays, by first evacuating and then injecting gas, or by evacuating and simultaneously injecting gas in areas of the trays separated from each other.

7. A machine for packaging products in rigid or semirigid trays sealed across the top by a thermoplastic film, for producing packs with a modified or nonmodified atmosphere, having intermittent operation, comprising:

a first station arranged to prepare groups of product-filled trays arranged with a predetermined mutual spacing in one or two parallel rows;

a second station arranged to close and heat-seal a cover onto the top edge of said groups of trays, after removing the air from said trays and replacing said air with a modified atmosphere useful for the preservation of the packaged products and with a subsequent cutting mechanism to separate the closed trays from a length of film from which said closing cover is taken;

a third station arranged to discharge the groups of trays with the packed product;

the first station comprising a horizontal conveyor having parallel belts having a predetermined tension in annular grooves of the parallel shafts and mounted on a base frame, wherein the shaft with the greatest diameter is driven by a motion unit, the upper run of the conveyor being constructed to be divided into two longitudinal lanes correlated in width to the width of the trays, by a longitudinal central guide connected to lower parts of said frame and provided with divider ends and by lateral guides projecting vertically a short distance from the upper run of the conveyor and connected to the frame in such a way that they can be adjusted to suit the dimensions of the trays, the upper run of which belts runs on small idle grooved rollers supported rotatably at either end by brackets connected to boxes having adjustment clamps on their underside and removably attached to guides positioned longitudinally and in the center of the base frame, to which they are fixed at either end by crossmembers, vertical rods emerging in a guided manner from the top wall of said boxes to support the base of prevention profiles whose vertical side has upwardly open teeth with rounded points, which in the rest position are positioned beneath the upper run of the conveyor so as not to interfere with the passing trays and which, on command, can be raised by linear actuators so that the teeth pass between and above the belts to create perpendicular barriers between said longitudinal guides to stop the trays on the upper run of the conveyor, their contact being distributed across the transverse surface of said trays, which as a result can be stopped precisely in accordance with a predetermined plan and order, the top wall of said boxes having sensors which face upwards to detect objects in the free space between a pair of adjacent belts to thus detect the presence or absence of a tray upstream of said prevention profiles.

\* \* \* \* \*